Dec. 2, 1969            Y. PELENC            3,482,124
LINEAR MOTOR WITH STATIONARY FIELD STRUCTURE
Filed Nov. 13, 1967
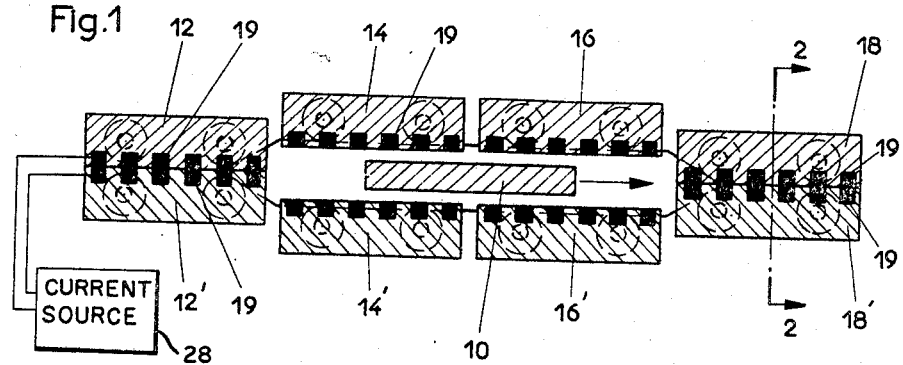
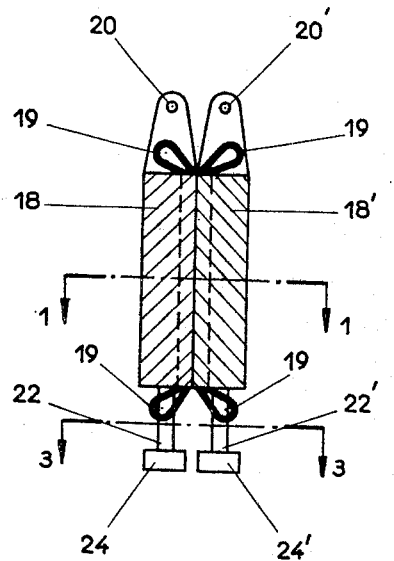
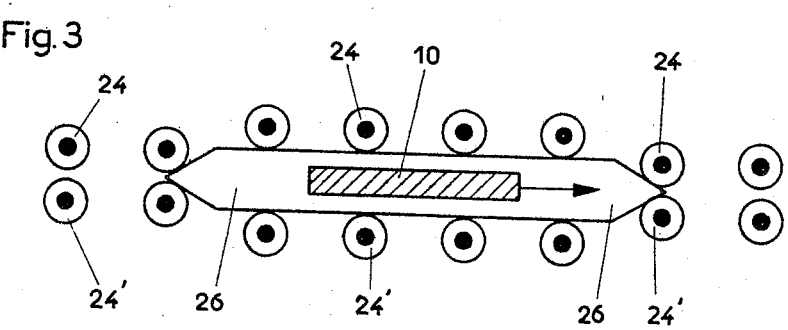

United States Patent Office 3,482,124
Patented Dec. 2, 1969

3,482,124
LINEAR MOTOR WITH STATIONARY FIELD STRUCTURE
Yves Pelenc, La Tronche, France, assignor to Merlin Gerin, Société Anonyme, Grenoble, France
Filed Nov. 13, 1967, Ser. No. 681,976
Claims priority, application France, Nov. 24, 1966, 84,919
Int. Cl. H02k 41/00
U.S. Cl. 310—12         6 Claims

ABSTRACT OF THE DISCLOSURE

An electromagnetic linear motor consisting of a stator arranged to produce a magnetic field distributed along a rectilinear path and an armature movable relatively thereto within the field acted upon electrodynamically by a force tending to move it along the said path. The stator comprises a plurality of sections, each longitudinally divided in two parts. The parts of each section are normally maintained together and are moved apart transversely upon the passage of the armature.

---

The present invention relates to linear motors with elongated stationary field structure or magnet and moving armature, the field magnet being longitudinally divided to permit the passage of the armature and comprising a plurality of sections which are aligned in the direction of travel of the armature, the magnetic circuit of each section being composed of two parts arranged on opposite sides of the path of the armature.

In such a motor in which the field magnet extends over the entire linear path of the armature, there is active at each instant only the portion of the field magnet (or stator) within the gap of which the armature is located at such instant. The length of this portion is relatively small as compared with the total length of the stator and the largest portion of the magnetic field created by the stator is unused most of the time. The efficiency of such a linear motor is therefore relatively poor, the magnetizing current being relatively high.

The object of the present invention is to improve the efficiency of such a linear motor by decreasing the consumption of current in the nonactive parts of the stator.

The electric motor in accordance with the invention is characterized by the fact that the said two parts of each section are movable with respect to each other, means being provided to cause the said two parts of each section to move apart transversely upon the passage of the armature between said parts and to bring said parts together before and after the passage of the armature.

As the gap is therefore practically zero, aside from the moments of the passage of the armature, the consumption of energy in these sections of the stator is very small, despite the fact that these sections are permanently connected to the source of current.

In accordance with another important feature of the invention, the said means normally urge the said portions of each section towards each other, the armature causing the said moving apart by mechanical means. The armature itself therefore opens its own path in front of it, moving the portions of the stator away from each other.

One embodiment of the invention will now be described by way of illustration but not of limitation, shown schematically in the accompanying drawing in which:

FIG. 1 is a schematic plan view of the armature and a part of the field magnet (stator) along the line 1—1 of FIG. 2;

FIG. 2 is a section along the line 2—2 of FIG. 1;

FIG. 3 is a view similar to that of FIG. 1 showing the lower portion of the field structure provided with spacing wheels, seen along the line 3—3 of FIG. 2.

In the figures, a movable armature 10 cooperates with a field structure or stator of large length subdivided into a large number of sections extending over a linear path, only four sections 12, 14, 16 and 18 being shown in FIG. 1. The magnetic field produced by the polyphase windings of the field structure or magnet in known manner (which will not be described in detail) is a traveling field which slides in the longitudinal direction of the field magnet (see the arrow in FIG. 1). Each field-magnet section 12, 14, 16, 18, etc., is divided into two parts 12, 12'; 14, 14'; 16, 16'; 18, 18', etc., arranged on opposite sides of the path of the armature 10 which is made of conductive material, and the magnetic circuit of the two parts can be wound at 19 to create a traveling magnetic field transverse with respect to the path of the armature. A single part can be provided with windings, the magnetic field being then produced by said wound part of the field magnet, which is arranged on only one side of the armature 10, the other part of the field magnet which is arranged on the other side of the armature serving as unwound ferromagnetic yoke which closes the magnetic circuit.

The armature 10, which preferably does not bear any windings, may be of any suitable shape.

The different sections 12, 14, 16, 18 and 12', 14', 16', 18' of the field magnet are pivoted in pairs at their upper portion on fixed pins, such as the pins 20 and 20' in the case of the sections 18 and 18', respectively, which are parallel to the longitudinal direction of the field magnet so as to permit the two parts, such as 18 and 18', of each section to come together under the influence of the forces of magnetic attraction produced by the field of the field magnet, reducing the gap to a value of substantially zero, and can move apart sufficiently to permit the passage of the armature 10. It is, of course, possible to pivot only the parts of the field magnet which are located on one side of the armature 10 or to provide a mechanical attachment other than a simple articulation which would produce, for instance, a translation of the parts of the field magnet instead of a pivoting movement. The distance between the pin 20 and the center of the field magnet can furthermore be selected sufficiently large to effect a substantially linear movement of the moving parts of the field magnet. The field-magnet parts 12, 12' to 18, 18' bear at their lower part rods 22, 22', etc., around which there can freely turn rollers 24, 24', etc. Between a pair of rollers 24-24' there can be inserted a tapered spacer member 26 of elongated shape borne by the armature 10 and fastened to the latter in any manner for example by attachment rods.

In the embodiment illustrated in FIG. 3, the spacer member 26 is in the form of a spindle or needle of appreciable length as compared with the length of the armature 10 and the two rollers 24, 24' of each section of field magnet are located near the start and end of the section.

Depending on the length of the sections, they may bear only a single pair of rollers or else numerous rollers, the length of the spacer member 26 being selected as a function of the length of the sections of the field magnet.

The spreading apart of the portions of the stator can be effected in any other manner, for instance, mechanically, electrically or even pneumatically, without thereby going beyond the scope of the invention.

The arrangement in accordance with the invention operates in the following manner:

The polyphase windings 19 of the field structure or magnet being fed with alternating current from source 28, the parts of each section of said field magnet mutually attract each other megnetically and come into contact if the presence of the armature 10 does not prevent them from doing so. When the parts of the field magnet are in contact, the gap is very small and the consumption of electrical energy on the part of this section is reduced to a minimum. Upon the passage of the armature 10, the corresponding parts, such as 14, 14' and 16, 16' of the field magnet between which the armature 10 passes are spread apart by the spacer member 26 against which the rollers 24, 24' rest and the armature 10 can move longitudinally under the action of the Laplace forces resulting from the magnetic field created by the field magnet.

In these spread sections, the consumption of energy is a function of the mechanical power demanded of the motor but it is practically only these active sections which consume current, the other sections having a gap equal practically to zero.

Upon movement, the spacer member 26 borne by the armature 10 comes into contact with the rollers 24 of the successive sections, the tapered portion of the member causing, upon the insertion thereof between a pair of rollers, a progressive moving apart of the latter and of the parts of the field magnet to which they are fastened, thus creating a gap which permits the passage of the armature 10.

It should be noted that the spreading apart of the field-magnet parts is effected in opposition to the magnetic forces which tend to bring them together, and that a certain amount of mechanical work must be supplied by the armature 10 in order to spread the sections apart. A part of the energy expended can be recovered by providing a tapered portion also at the rear of the spacer member 26.

After the passage of the armature 10, the field-magnet parts therefore smoothly come together automatically, supplying a certain amount of energy to the armature 10 by clamping the tapered part which is arranged as a tail on the armature. The consumption of power is therefore reduced to a value which corresponds substantially to the power actually transmitted to the armature.

This particularly simple and strong arrangement makes it possible to limit the loss of electrical energy to a minimum and makes such motors suitable for use in particular for overhead conveyors extending over large distances.

What is claimed is:

1. An electromagnetic linear motor comprising a moving armature,
    an elongated stationary field structure having a magnetic circuit divided in a plurality of sections aligned in the direction of travel of said armature, each longitudinally divided in two parts arranged on opposite sides of said armature,
    a coil winding producing a magnetic field in said magnetic circuit, attachment means at least of the said parts located on one side of the armature allowing a transverse movement of the parts relative to said direction of travel,
    means bringing said parts together in abutment before and after the passage of the armature,
    and dividing means moving apart said parts upon passage of the armature.

2. An electromagnetic linear motor as set forth in claim 1 wherein said magnetic field produced by said coil winding brings said parts together.

3. An electromagnetic linear induction motor comprising a moving armature,
    an elongated stationary field structure having a magnetic circuit divided in a plurality of sections aligned in the direction of travel of said armature, each longitudinally divided in two parts arranged on opposite sides of said armature,
    a polyphase electric current source,
    coil windings producing a magnetic field varying in intensity and in which the point of maximum flux intensity travels along said stationary field structure.
    attachment means at least of the said parts located on one side of the armature allowing a transverse movement of the parts relative to said direction of travel,
    means bringing said parts together in abutment before and after the passage of the armature,
    and dividing means moving apart said parts upon passage of the armature.

4. An electromagnetic linear induction motor as set forth in claim 3 wherein said magnetic field produced by said coil windings brings said parts together.

5. An electromagnetic linear induction motor as set forth in claim 4 comprising mechanical dividing means secured to said armature which mechanically causes the said moving apart of the parts.

6. An electromagnetic linear induction motor as set forth in claim 5 wherein said mechanical dividing means is a tapered elongated spacer member secured on both ends of the armature.

References Cited

UNITED STATES PATENTS

| | | | |
|---|---|---|---|
| 2,135,373 | 11/1938 | Wilson | 318—135 |
| 2,964,260 | 12/1960 | Edelman et al. | 310—13 XR |
| 3,218,489 | 11/1965 | Sadler | 319—13 |
| 3,292,065 | 12/1966 | Fredrickson | 310—12 |

MILTON O. HIRSHFIELD, Primary Examiner

B. A. REYNOLDS, Assistant Examiner

U.S. Cl. X.R.

310—13